Figure 1:
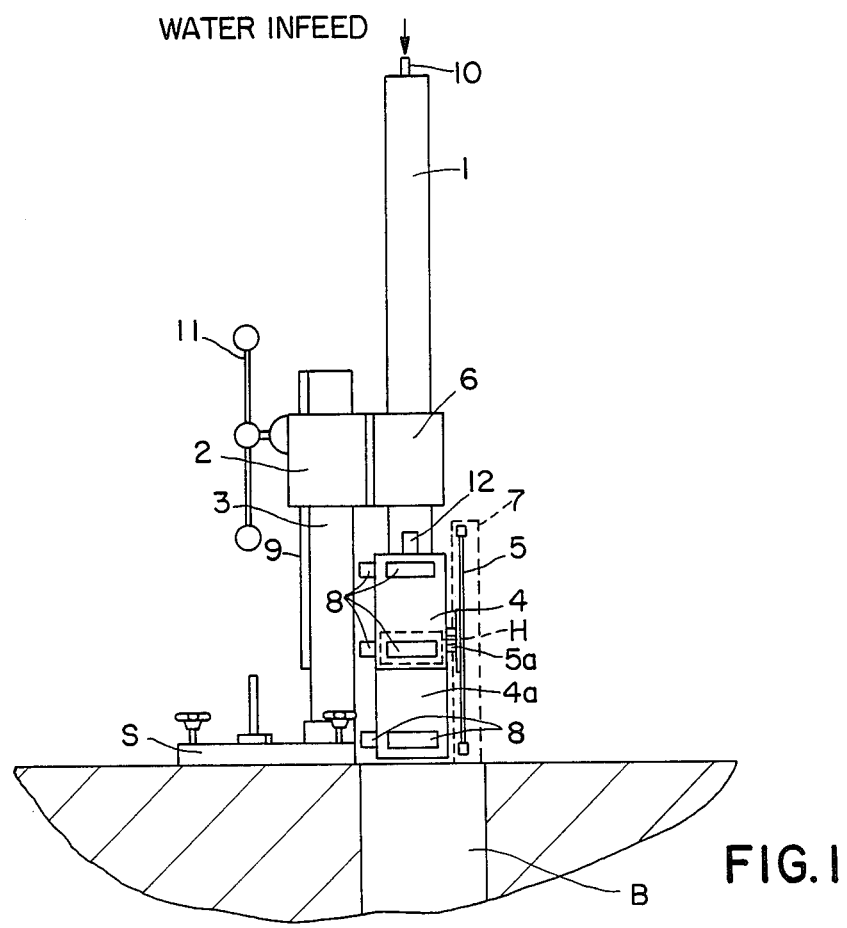

United States Patent [19]

Schuldei

[11] Patent Number: 4,869,227
[45] Date of Patent: Sep. 26, 1989

[54] PROCESS AND DEVICE FOR PRODUCING DEEP CUTS IN CONCRETE OR SIMILAR MATERIAL

[76] Inventor: Paul H. Schuldei, Kirschenweg 13, D-3100 Celle, Fed. Rep. of Germany

[21] Appl. No.: 64,302

[22] PCT Filed: Oct. 15, 1986

[86] PCT No.: PCT/EP86/00589

§ 371 Date: Aug. 14, 1987

§ 102(e) Date: Aug. 14, 1987

[87] PCT Pub. No.: WO87/02302

PCT Pub. Date: Apr. 23, 1987

[30] Foreign Application Priority Data

Oct. 18, 1985 [DE] Fed. Rep. of Germany ... 8529668[U]
Jun. 19, 1986 [DE] Fed. Rep. of Germany ....... 3620553

[51] Int. Cl.$^4$ .............................................. B28D 1/04
[52] U.S. Cl. ..................................... 125/13 R; 299/39
[58] Field of Search ................... 125/13 R, 15, 18, 3, 125/5; 299/39

[56] References Cited

U.S. PATENT DOCUMENTS

| | | | |
|---|---|---|---|
| 1,909,001 | 12/1966 | Carroll et al. | 83/54 |
| 2,557,251 | 6/1951 | Baker et al. | 125/13 R |
| 3,127,886 | 4/1964 | Miller | 125/13 R |
| 3,293,963 | 5/1933 | Nelson | 125/13 R |
| 3,430,714 | 3/1969 | Brieger | 125/15 X |
| 4,134,459 | 1/1979 | Hotchen | 299/39 X |
| 4,233,954 | 11/1986 | Visser | 125/14 |
| 4,406,274 | 9/1983 | Ogyu | 125/13 R |
| 4,717,205 | 1/1988 | Sasage | 299/39 |

FOREIGN PATENT DOCUMENTS

| | | | |
|---|---|---|---|
| 1427756 | 1/1969 | Fed. Rep. of Germany | 125/13 R |
| 1427737 | 2/1969 | Fed. Rep. of Germany | 125/2 |
| 1427763 | 11/1969 | Fed. Rep. of Germany | 125/15 |
| 1577987 | 2/1970 | Fed. Rep. of Germany | 125/13 R |
| 2306242 | 9/1973 | Fed. Rep. of Germany | 125/13 R |
| 2402311 | 7/1975 | Fed. Rep. of Germany | 125/13 R |
| 2558781 | 7/1977 | Fed. Rep. of Germany | 125/13 R |
| 1602008 | 5/1980 | Fed. Rep. of Germany | 125/13 R |
| 13301 | 3/1911 | France | 299/39 |
| 439160 | 6/1912 | France | 125/1 |
| 750746 | 8/1933 | France | 125/1 |
| 1181703 | 6/1959 | France | 299/79 |
| 1375448 | 9/1964 | France | 299/39 |
| 157066 | 11/1956 | Sweden | 125/13 R |
| 254282 | 2/1926 | United Kingdom | 299/39 |

Primary Examiner—Robert P. Olszewski
Assistant Examiner—Shirish Desai

[57] ABSTRACT

Process and device for making deep cuts in concrete, reinforced concrete, a masonry or similar structure, involving the use of a circular saw blade (5) and a guide bore (B) made directly next to the cut to be made and prior to the cutting process. The saw body (4) which drives and carries laterally the saw blade is inserted if as the cutting progresses. The guide bore is dimensioned so that the projection of the saw blade in the region of the shaft on the bore still lies inside the latter.

9 Claims, 3 Drawing Sheets

PROCESS AND DEVICE FOR PRODUCING DEEP CUTS IN CONCRETE OR SIMILAR MATERIAL

The invention refers to a process and a device for producing deep cuts in concrete or similar material.

The British Patent PS 254 282 describes a method of cutting concrete, steel reinforced concrete or brickwork with the aid of circular saw blades. For this purpose the circular saw blades are fitted with diamond tips. However, such cuts are limited in their depth by the fact that only half the saw blade diameter can be used. For deeper cuts a perforation process exists in which one hole after another is drilled in a row which then produces cut-outs. However, such processes are relatively complex.

The invention is based upon the task of making it possible to use circular saw blades for providing deep cuts in concrete or similar materials.

This task is solved by the invention stated in the main claim. Further designs of the invention are described in the subordinate claims.

On principle a guide hole is initially produced next to the proposed cutting position of the circular saw blade. Then a guide which is connected to the drive of the circular saw blade is inserted into this guide hole. The rotating saw blade penetrates to a deeper level as the drive section is pushed further into the hole and is therefore lowered as required to obtain the desired depth of the cut. The guide and the drive sections are mounted on a guide column so that they can move in the direction of penetration by the saw blade. The guide column is stiff enough to prevent the saw blade from being damaged during the cutting operation.

Two design examples are used to explain the invention in more detail with the aid of the drawings. These drawings show:

FIG. 1: A side view of a drill stand serving as a guide column with a holder for the drive and guide.

Figure 2:
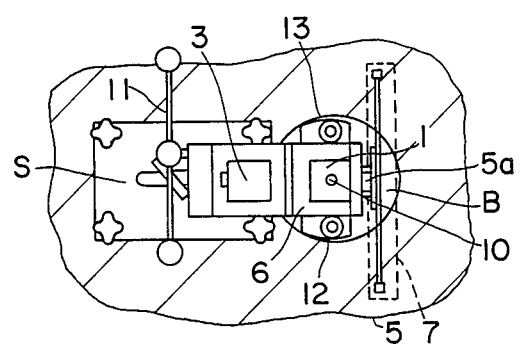

FIG. 2: A top view of the configuration according to FIG. 1.

Figure 3:
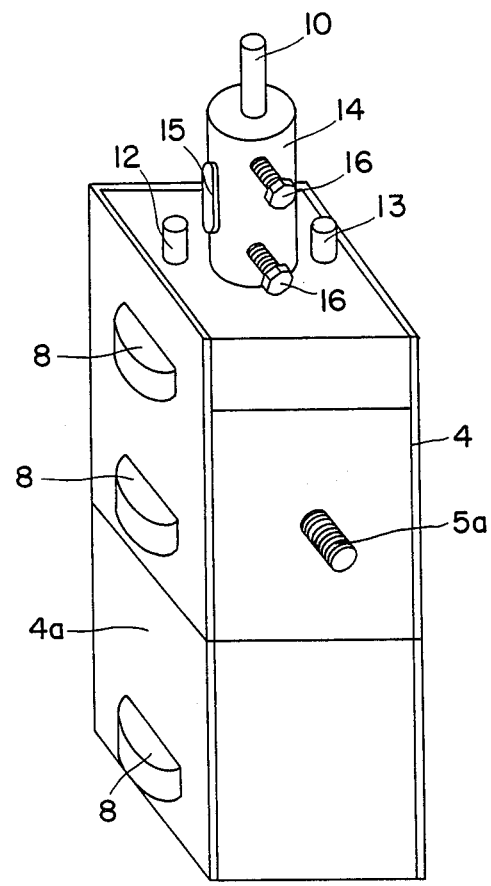

FIG. 3: A perspective view of the saw body and guides according to FIGS. 1 and 2.

Figure 4:
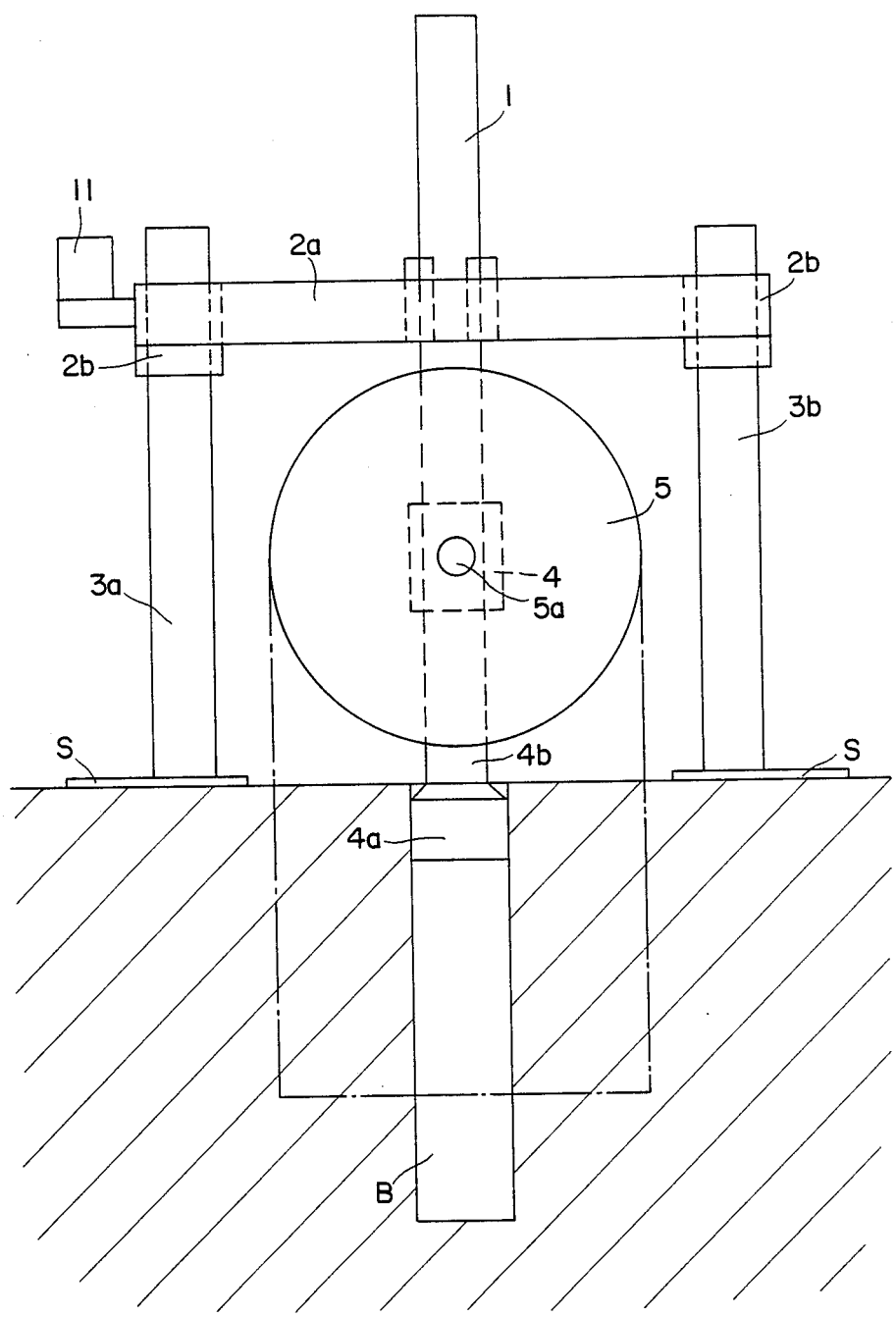

FIG. 4: A drill stand having a crossbeam secured on both sides.

FIG. 1 shows a device for the production of deep cuts with a circular saw blade. A column (1) in the form of a square steel guide rod is combined with a feed unit (2) to form an adjustable unit which can move along a drill stand (3). A saw (4) which includes both the drive stand (3). A saw (4), which includes both the drive device for a saw blade (5) as well as a guide (4a) for controlling the sawing position in a guide hole (B), is connected to the square guide rod (1) as may be seen from FIG. 2, the saw blade is of a diameter to extend both above and below the saw unit 4. Since the guide (4a) is mainly only required in the first phase of the cutting operation it is removably connected to the saw body of unit 4. In particular with very deep cuts a guide hole (B) can be used which is shorter than a dimension of the radius depth of the cut by the radius of the saw blade (5). The guide (4a) is removed after first phase for cuts. The saw (4) includes guide sections (8) which allow the saw (4) to be held at three points against the wall of the guide hole (B). The square guide rod (1) is movably secured in a mounting (6). This makes it possible to use a square guide rod (1) with a length corresponding to the cutting depth and a relatively short drilling stand. After the cutting depth corresponding to the length of the drilling stand (3) has been reached the square guide rod (1) is moved relative to the mounting (6), the feed unit (2) is moved back to its highest position, the guide rod (1) is re-secured and the cutting process is then continued. A rack (9) on the drill stand (3) guarantees accurate and fine adjustment of the feed unit (2). A blade guard (7) protects both the operator against injury as well as the saw blade against external damage. The saw blade guard (7) can also be designed to collect the cooling and/or flushing water. As indicated in FIG. 1 the cooling water is fed through a pipe (10) at the upper end of the square guide rod (1) and is sprayed against both sides of the saw blade (5). The water then flows through the sawn slot and is collected by the blade guard (7). The water can then be returned into the circuit or can be disposed of as required. The drilling stand (3) is secured in a desired position, on the material to be cut, for example by means of rawl plugs and bolts in the material involved. The feed unit (2) can be operated manually, by means of a lever (11), or operated by a motor.

FIG. 2 shows a top view of the above described structure. The guide hole (B) with the saw unit (4) and the square guide rod (1) extending the mounting (6), the water feed line (10) and the square drilling stand (3) with the lever (11) are shown in FIGS. 1 and 2. As the power required for driving the saw blade is for example 15 kW the drive power is preferably provided by means of a hydraulic motor (H) which is fitted in the saw unit (4). Such hydraulic motors are widely available. The feed (12) and return (13) lines conduct hydraulic fluid to and from the motor (H). The use of square rods for the guides (1) and the drilling stand (3) provides optimum resistance to twisting. This means that even deep cuts can be produced with just one saw blade. Two guides (8) which can for example be manufactured of a synthetic material are on each side in the guide hole (B) are shown in FIG. 2. The third guide part (8) in each case is below the mounting (6) and thus not seen in FIG. 2, but is clearly shown in FIG. 1.

FIG. 3 shows the saw (4) in a perspective view. In addition to the details shown in FIGS. 1 and 2 this also shows the connection point of the square rod (1) and the saw (4). A cylindrical shoulder (14) which is joined to the saw body mounts a spring (15). Spring (15) and shoulder (14) extend into a suitable opening (not shown) in the front face of the column (1) and are retained in position by the combination of a column groove and spring (not shown) and bolts (16).

FIG. 4 shows a cutting device with two drilling stands (3a, 3b) and a crossbeam (2a) to which the column (1) is secured to prevent torsion. The column (1) is provided with a saw (4) which also serves as the housing for the drive unit for the saw blade (5) through the drive shaft (5a).

Removably secured to the bottom end of the body of the saw (4) is a guide with a guide section (4a), which like the saw unit (4) of FIGS. 1-3 is matched to the shape of the guide hole (B) to prevent lateral displacement of the saw blade (5) when cutting is started. The guide unit (4a) and the saw (4) are matched to the shape of the hole (B) so that initially the guide (4a) and, after reaching a certain cutting depth, the saw (4) prevent lateral displacement in the hole (B). The crossbeam (2a) is secured to the two drill stands (3a, 3b) by means of two bushes (2b) to permit the cross beam being moved up and down by a feed unit (2) shown in FIG. 1 but not shown in FIG. 4. The feed unit (2) can be mounted to one of the columns (3a, 3b). However, it can also be an advantage to provide a parallel guide for the other column (3a, 3b). This device (2) can be of a conventional design. When the crossbeam (2a) is moved up and down by means of the feed unit (2), the column (1) and therefore the saw (4) with the saw blade (5) are moved up and down. The guide (4a) can be removably secured to the body of the saw (4) in one unit as shown in FIG. 1 or it can be connected to the saw (4) according to FIG. 4 by a column (4b) which is similar or identical to the column (1). The important fact is only that the guide (4a) enters the guide hole (B) before the saw blade (5) can engage the surface of the material to be cut and be deflected from the desired position by the cutting process. The maximum level of safety is provided when the guide enters the guide hole before sawing is started.

With the cutting devices shown in FIGS. 1-4 deep cuts and deep or even continuous rectangular holes or cut-outs can be produced in concrete, steel reinforced concrete, brickwork or similar materials by using circular saw blades. A process for the provision of such cuts is described in the following section.

After the position of the cuts has been determined, a guide hole (B) is provided next to the position of the subsequent cut. The position and diameter of the guide hole (B) is to be according to the construction of the cutting unit used. The position of the hole (B) must correspond to the distance of the circular saw blade (5) from the saw unit (4). The diameter of the hole (B) is selected so that the guide (4a) and the saw (4) together with the drive shaft (5a) can be moved into the hole and moved up and down within the hole without problems. The drilling stand (3) of the cutter unit is assembled before or after providing the guide hole (B) and is securely connected to the ground, for example by bolts passed pass through the base (S) of the drilling stand and are held in plugs in the ground. The guide hole (B) can be drilled by a drill used on the drilling stand (3). This means that the guide hole and the direction of travel of the circular saw blade run in the same direction. The saw blade (5) is mounted on the saw (4) and adjusted so that the saw blade (5) can execute the cut as required. This adjustment can be by precisely determining the mounting position of the drilling stand or by displacing the drilling stand (3) relative to its holder. The sawing process commences when the saw (4) with the guide (4a) and the rotating saw blade (5) is lowered in the direction towards the guide hole and therefore in the direction of the cut. The drilling stand (3) and the guide rod (1) stabilize the assembly (4, 4a, 5) when it is being lowered. The use of square rod material for the guide columns also ensures a good level of stiffness and resistance to twisting during the cutting operation. As soon as, or even before, the saw blade starts to cut and heavy forces are applied to the body of the saw (4), the guide (4a) enters the guide hole and stabilizes the assembly against the forces about to occur, to prevent damage to the saw blade (5) which could result from possible changes in the angles involved.

As the saw (4) is lowered, the saw blade (5) cuts progressively deeper and when the cutting depth corresponding to the radius of the saw blade is reached, the shaft (5a) enters the guide hole (B). When this position is reached the guide (4a) can be removed from the body of the saw (4). In this way cutting depths are achieved which exceed the radius of the saw blade. It is unimportant for the process involved whether the material is to be cut right through or whether rectagonal or angled cut-outs are to be made. The feed unit (2) allows cuts up to depths which exceed the height of the drilling stand (3). For this purpose, after reaching a depth corresponding to the height of the drilling stand (3), the column (1) is released from the mounting (6), this mounting is moved back to an uppermost position relative to column C, and the cutting process is continued after re-securing the column (1) in the mounting. It can be an advantage to execute the cut with more than just one single saw blade to obtain the size of the cut required. The first cut can be executed with a saw blade (5) of approx. 450 mm diameter. If a cutting length greater than this is required then the cut is repeated with one or more blades of greater diameters. For this, the first cut is carried out with a cut width of approx. 4.5 to 5.5 mm. Further cuts can then be executed with lower cut widths (diamond tip widths). This avoids or reduces the friction of the saw blade against the wall of the existing cut.

If longer cuts are required than would be possible with circular saw blades of normal diameters, such cuts are preferably executed in series. For this, the drilling stand is offset in the direction of cutting and is secured again and the cut is carried out in the manner described above. Saw blade diameters of 1000 to 2000 mm represent the upper economic limit at the present time. Longer cuts are therefore produced by repeated single cuts, lowering the saw blade for each individual cut. It is also possible to mount the drilling stand (3) on profile tracks which run parallel to the cuts. These tracks are secured to the ground and the drilling stand (3) can then be moved as required, instead of repeatedly being dismantled and reset. Such tracks make it possible to greatly simplify the adjustment work required in resetting the drilling stand.

A major difference between the new process for the production of deep cuts and the existing cutting process using circular saw blades for low cutting depths consists of the fact that in place of the cutting tool moving continuously along the cut parallel to the surface of the material there is a step by step movement along the surface with individual stationary deep cuts in the direction towards the material. In contrast to the existing processes for providing a series of individual holes in order to produce deep cuts there is therefore the advantage of straight and even cuts. Each cut has its own guide hole. Thus, when the total length of the desired cut is to be made up of a series of individual cuts, a guide hole is provided for each individual cut. When the guide holes have been provided in advance the deep cuts can be executed in all planes. With deeper cuts, in particular to achieve longer cuts than would be possible with just one saw blade, it is an advantage to locate the guide holes (B) at such distances apart, according to the diameter of the saw blade, that the saw blade used for the subsequent cut can be guided by the previous cut. The individual cuts therefore overlap. This means that the slot of the previous cut acts as a guide for the rotating saw blade of the saw (4). In this case the guide (4a) may under certain circumstances be removed from the body of saw (4) for the subsequent cuts because it is no longer required. If the blade can be guided by the slot of the previous cut before the saw enters the guide hole then the guide (4a) can be removed after the first cut, for example, when a small saw blade is used for the first cut and then replaced by a larger saw blade for the second cut.

The guide hole can be of such a size that lateral movements of the saw (4) in the guide hole are largely prevented, i.e. that the walls forms a sliding contact. It is however also possible to make the hole so large that the saw is controlled practically without mechanical contact. When cutting in steel reinforced concrete it is possible that the guide hole may differ from the proposed cutting angle and can therefore result in the guide (4a) or the saw (4) becoming jammed. In such cases the use of ball bearings is an advantage.

I claim:

1. A process for making deep cuts in concrete, steel reinforced concrete, brickwall and similar materials, comprising drilling a guide hole of a given diameter in the material to be cut, and moving a saw body including the saw motor of the saw into the guide hole as the material is cut by the circular saw blade and said blade is of a larger diameter than the diameter of the hole; wherein the saw blade is along the side of the saw body; and further characterized in removably attaching to the saw body a guide to be movable into the hole prior to the saw body during the cutting step and wherein the guide enters the hole prior to the saw blade engaging the material to be cut.

2. The process of claim 1 further characterized in that the cutting step comprises making a first cut with a first saw blade of a greater diameter than the diameter of the hole, thence replacing the first blade with a second blade of a greater diameter than the first blade and then moving the saw body to move the second blade into the first cut to make a second cut that is larger than the first cut and thereafter move saw body into the hole.

3. The process of claim 1, further characterized in drilling a second hole that is spaced from the first hole and after removing the saw body from the first hole, moving the saw body into the second hole to have the blade make a second cut that opens to the first cut, the spacing of the first hole from the second hole being selected to have the second cut open to the first cut.

4. The process of claim 1 further characterized in that the guide hole is drilled to a depth that is less than the depth of the cut to be made.

5. The process of claim 1 further characterized in that prior to making the cut, a stand having a selectively operable, vertically movably feed unit thereon is secured to the material to be cut, the saw body is secured to a lowering column and the lowering column is mounted to the feed unit to, when the feed unit is operated, move the saw body relative to the material to be cut.

6. The process of claim 5, further characterized in that the saw body moving step comprises operating the feed unit to lower the column and thereby the saw body, thence moving the feed unit on the lowering column to be further spaced from the saw body than it was prior to the above operating step, and thereafter operating the feed unit to lower the column and thereby the saw body to increase the depth of the cut.

7. The process of claim 1 wherein the hole is vertical and the saw blade is of a diameter to extend both above and below the saw unit 4.

8. A process for making deed cuts into concrete, steel reinforced concrete, or similar materials, comprising making a guide hole of a given diameter in the material directly adjacent to the proposed cut and moving a saw body and the drive motor of the cutter unit into the hole with a circular saw blade of a larger diameter than the given diameter and laterally offset from the saw body and is drivenly rotated by the drive motor to make the cut, and further characterized by the fact that said guide hole is provided with such a diameter that the saw can be moved in the hole in a sliding motion or with little friction.

9. The process according to claim 8 wherein the saw body includes a side and the drive motor includes a drive shaft that extends through the body side and mounts the saw blade to rotate the saw blade.

* * * * *